(12) United States Patent
Jiang et al.

(10) Patent No.: US 11,578,384 B2
(45) Date of Patent: Feb. 14, 2023

(54) LASER SHOCK STRENGTHENING METHOD FOR SMALL-HOLE COMPONENTS WITH DIFFERENT THICKNESSES

(71) Applicant: JIANGSU UNIVERSITY, Zhenjiang (CN)

(72) Inventors: Yinfang Jiang, Zhenjiang (CN); Fuwen Zhu, Zhenjiang (CN); Wenfan Jiang, Zhenjiang (CN); Sili Wang, Zhenjiang (CN); Jian Zhao, Zhenjiang (CN); Wei Jin, Zhenjiang (CN); Cheng Hua, Zhenjiang (CN); Xu Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 525 days.

(21) Appl. No.: 16/614,248

(22) PCT Filed: Jun. 8, 2017

(86) PCT No.: PCT/CN2017/087535
§ 371 (c)(1),
(2) Date: Nov. 15, 2019

(87) PCT Pub. No.: WO2018/209739
PCT Pub. Date: Nov. 22, 2018

(65) Prior Publication Data
US 2021/0363605 A1    Nov. 25, 2021

(30) Foreign Application Priority Data

May 18, 2017    (CN) .......................... 201710351431.6

(51) Int. Cl.
*C21D 10/00*     (2006.01)
*B23K 26/356*    (2014.01)
*B23K 103/10*    (2006.01)

(52) U.S. Cl.
CPC .......... *C21D 10/005* (2013.01); *B23K 26/356* (2015.10); *B23K 2103/10* (2018.08); *C21D 2221/00* (2013.01)

(58) Field of Classification Search
None
See application file for complete search history.

(56) References Cited

U.S. PATENT DOCUMENTS

2007/0262063 A1*  11/2007  Sano ................... B23K 26/356
                                                     219/121.85
2008/0241546 A1   10/2008  McClain et al.
                          (Continued)

FOREIGN PATENT DOCUMENTS

CN          1827284 A      9/2006
CN          1944687 A      4/2007
                          (Continued)

OTHER PUBLICATIONS

English Translation of International Search Report corresponding to International Patent Application No. PCT/CN2017/087535 dated Jan. 25, 2018.

(Continued)

*Primary Examiner* — Ibrahime A Abraham
*Assistant Examiner* — Elizabeth M Kerr
(74) *Attorney, Agent, or Firm* — Jenkins, Wilson, Taylor & Hunt, P.A.

(57) ABSTRACT

The invention provides a laser shock processing method for small-hole component with different thickness. In this method, different process parameters are adopted for laser shock processing of small hole members with different thicknesses, and the empirical formula was obtained by statistical analysis of the experimental results, and the empirical formula $$I_0 = Ae^{\frac{t}{B}}\frac{\sigma_s^2}{Z}$$

(Continued)

is the relationship between power density and thickness of small hole members. According to this formula, the power density of laser shock strengthening of orifice member with different thickness is determined, and the selection and determination method of process parameters related to this is put forward. According to this method, reasonable residual compressive stress distribution can be obtained after laser shock strengthening with appropriate technology, and good strengthening effect can be achieved.

7 Claims, 1 Drawing Sheet

(56) References Cited

U.S. PATENT DOCUMENTS

2010/0226780 A1* 9/2010 Bailey .................... F01D 5/286
　　　　　　　　　　　　　　　　　　　　　　416/223 R
2013/0180969 A1* 7/2013 Cheng .................. B23K 26/356
　　　　　　　　　　　　　　　　　　　　　　219/121.85
2017/0087670 A1* 3/2017 Kalentics ............. B23K 26/342

FOREIGN PATENT DOCUMENTS

| CN | 101024862 A | 8/2007 |
| CN | 101275177 A | 10/2008 |
| CN | 102517413 A | 6/2012 |
| CN | 102778317 A | 11/2012 |
| CN | 103014276 A | 4/2013 |

OTHER PUBLICATIONS

English Translation of IPRP and Written Opinion corresponding to International Patent Application No. PCT/CN2017/087535 dated Nov. 19, 2019.

* cited by examiner

LASER SHOCK STRENGTHENING METHOD FOR SMALL-HOLE COMPONENTS WITH DIFFERENT THICKNESSES

TECHNICAL FIELD

The invention relates to the field of laser processing, in particular to a laser shock processing method for small hole members with different thicknesses which adopt different laser parameters for laser shock processing, so that the reinforcing effects of small holes with different plate thicknesses are in a good state.

BACKGROUND ART

The small hole member is a typical stress concentration detail, which is easy to generate fatigue crack under fatigue load, affecting the performance and service life of key structures. Many mechanical members need to be drilled, especially aircraft members which need thousands of holes and become the weak link of the members, and these members are different in thickness. Conventional mechanical strengthening methods such as mechanic shot peening, extrusion strengthening, etc. are limited by the aperture, and it is not easy to strengthen small holes of 3 mm or less in diameter. Laser shock processing is an advanced material strengthening method, which has the advantages of non-contact, no deformation, no thermal influence zone and significant strengthening effect, etc. However, it is a major difficulty in this field that how to control laser parameters to ensure the small hole members with different materials and different thicknesses achieving good strengthening effect after laser shock processing.

Patent CN102517413 describes a small hole strengthening method, which is carried out by first using a large spot and high energy laser to impact-enhance the surface of the small hole member to be drilled, so that the small hole member generates residual compressive stress deeper in the thickness direction. Then, using a small spot and small energy laser to perform secondary laser shock processing on the surface around the small hole member to be drilled, so that the surface of the small hole member has a good residual compressive stress, and finally drilling. This method avoids the problem that the quality of the end face of the hole is not high after laser shock processing after drilling the hole first, but the method does not achieve the best strengthening state of the holes of various thicknesses and require high power laser equipment.

Patent CN103014276 describes a small hole strengthening method using a combination of a cone indenter and a laser. One side is laser-impacted, and the corresponding side of the laser impact is pressed with a special cone indenter, and finally a hole is drilled at the pressed position. Although the method makes the hole wall of 4 mm-6 mm plate thickness a compressive stress state, the cone pressing process easily deforms the plate, and the surface quality of the cone pressing surface cannot be guaranteed. The residual compressive stress of the hole wall with different plate thickness is unstable, especially the quality of thick plate processing is difficult to guarantee.

Patent application No. 200610096476.5, the invention name is a method and device for strengthening the hole wall based on the laser shock wave technology, and it is proposed to insert a reflection cone into the aperture of the apertured hole member and apply the upper energy absorption layer and the constrained layer on the cone surface of the reflection cone, and then the hole wall is subjected to laser shock processing. Compared with the mechanic shot peening, the method is not limited by the pore size, and can make the stress of the strengthening layer uniform. However, since it is first drilled and then strengthened, the laser will cause certain damage to the small hole, thereby affecting the precision of the hole and the wall of the hole surface quality.

SUMMARY OF THE INVENTION

The invention aims at the above deficiencies, and provides a laser shock processing method for small hole members with different thicknesses, which considers the strengthening effect of different thickness materials and the deformation of the small hole member and the surface quality requirement of the impact member. Aiming at the selection of laser shock processing process parameters for small hole members with different thicknesses, after a lot of experiments and statistical analysis, an empirical formula and process parameter determination method are proposed to ensure satisfactory fatigue gain at 95% confidence.

The technical solution of the present invention is that: The parameters of the present invention are selected based on the properties and the thickness of the material, the properties of the constrained layer and the absorption layer used, and the requirements of material deformation and surface quality after impact. First, the laser power density used for the material is determined in conjunction with the empirical formula; the secondly according to the selected power density and the laser device, the pulse width, laser energy and spot size are determined in turn; finally, the overlapping rate and the number of impact layers are determined according to the selection principle of the impact region and the coverage ratio. Specific steps are as follows:

1) Select the power density according to the material strength and material thickness of the small hole member, and the relationship between the power density and the thickness of the small hole member is determined by the formula $$I_0 = Ae^{\frac{t}{B}}\frac{\sigma_s^2}{Z}$$

which is an empirical formula obtained by statistical analysis after a large number of tests, $I_0$ is the laser power density, $\sigma_s$ is the yield strength of the material, t is the plate thickness, $2/Z=1/Z_1+1/Z_2$, $Z_1$ is the acoustic impedance of the material of the small hole member, and $Z_2$ is the acoustic impedance of the constrained layer, A is the comprehensive coefficient which is related to the material of the small hole member, the constrained layer and the absorption layer; B is the thickness influence coefficient, and is related to the material and thickness of the small hole member;

2) The lower limit should be met $P=k*\vec{I_0}$ with $P>2\ \sigma_s$, P is the peak pressure of the laser shock load acting on the material of the small hole member, $\sigma_s$ is the yield strength of the material, k is a constant associated with the constrained layer and the absorption layer;

3) Combining formula $$I_0 = \frac{4E}{\pi D^2 t_p},$$

the spot diameter D and the pulsed laser energy E are determined; $t_p$ is the laser pulse width, which is related to the laser, the thicker material member uses a larger laser pulse width $t_p$ which is 10 ns to 30 ns; the laser energy E and the laser Power-dependent, when the laser energy E is 2 J to 35 J, using a miniaturized laser and a smaller spot diameter D, the spot diameter D ranges from 2 mm to 6 mm; a high-power laser and a larger spot diameter D can increase production efficiency; under the premise of ensuring laser power density $I_0$, the spot diameter D and the pulsed laser energy E are appropriately adjusted; for example, a square spot, $I_0 = E/(\sqrt{D}*t_p)$, Where D is the length of the side of the spot;

4) After determining the laser energy E, laser pulse width $t_p$ and the spot diameter D, selecting the overlapping rate $\psi$ and the number of impact layers n; the circular spot overlapping rate $\psi$ is about 50%, and the square spot overlapping rate is 10% or so; the number of impact layers n is 1 to 6, the determination of n is related to the yield strength of the material $\sigma_s$, laser power density $I_0$ and the light spot overlap rate $\psi$; when $\sigma_s$ is small, $I_0$ is large and $\psi$ is large, n is lower limit; lap rate $\psi$=adjacent spot repeat distance I/Spot diameter D (or spot length).

The spot lap rate $\psi$ and the number of impact layers n are also limited by the average coverage $\eta$, the average coverage $\eta = N*s_1/S$, N is the total number of spots on the impact side, $s_1$ is the area of the spot, S is the area of the impact area of the hole; the average coverage $\eta$ is 200% to 800%, if the average coverage $\eta$ is not in the range of 200% to 800%, the overlapping rate iv and the number of impact layer n need to be re-selected.

The value of A in the empirical formula $$I_0 = Ae^{\frac{t}{B}} \frac{\sigma_s^2}{Z}$$

is related to the process parameters such as the component material, the constrained layer and the absorption layer; the main relevant factors are the component material and the constrained layer. The thickness influence coefficient B in the empirical formula is related to the material, when the material is aluminum alloy, B=6. When the material is aluminum alloy and the constrained layer is any one of water, K9 optical glass, plexiglass, silica gel or synthetic resin, the value of A ranges from 2 to 5.

In empirical formula $$I_0 = Ae^{\frac{t}{B}} \frac{\sigma_s^2}{Z},$$

when the material is titanium alloy, B=2.6; when the material is titanium alloy and constrained layer is any one of water, k9 optical glass, plexiglass, silica gel or synthetic resin, the value of A ranges from 0.5 to 1.25.

When the rigidity of the small hole member is large, and the surface hardness of the material is large, A can take the upper limit value; considering the requirements of the user on the deformation amount and surface roughness after the laser shock reinforced, A can be considered to float up and down.

The impact area of the laser is in the range of 2.8 d to 3.8 d, d is the diameter of the small hole, and when the thickness of the small hole member is large, the lower limit is taken; the distance between the laser impact region and the material boundary or the other laser shock region should be no less than 3 mm in order to reduce the edge effect and the influence between the impact region and the impact region.

The effect of laser shock treatment and then drilling the hole is better than that of the drilling the hole and then the laser impact; the impact mode is double-sided impact, which results in better stress distribution on the hole wall; when the overlapping rate is greater than 63%, the jump method is adopted to prevent damage of the absorption layer.

Compared with the prior art, the beneficial effects of the present invention are:

1. An empirical formula $$I_0 = Ae^{\frac{t}{B}} \frac{\sigma_s^2}{Z}$$

is proposed for the selection of power density for laser impact enhancement of small hole members with different thicknesses of different materials; the principle and method of selecting various laser parameters are clarified, and the scientificity of laser shock processing is improved.

2. The method can strengthen the surface and the hole wall of various plate thickness small hole members, and can well control the deformation of the sheet material.

3. The method can meet the strengthening needs of different hole sizes and ensure the quality of the hole walls.

4. This method reduces the requirements for lasers and other equipment, and can use a small energy laser to reduce the cost of small hole reinforcement.

5. The method can meet the customer's fatigue gain effect requirements and surface quality requirements within a certain range, especially to ensure stable processing quality of thicker plates.

6. This method breaks through the limitation that the small holes with a diameter of 3 mm or less cannot be strengthened, and ensures that the small hole members with different thicknesses of different materials can achieve a good strengthening effect after laser shock processing.

Table 1 is the laser shock parameters and fatigue gain of each plate thickness of the 7050-T7451 aluminum alloy in the conditions of the method;

Table 2 is the laser thickness parameters and fatigue gain of each plate thickness of TC4-DT titanium alloy in the conditions of the method;

Table 3 is the laser shock parameters and fatigue gain of each plate thickness of the 2024-T62 aluminum alloy under the conditions of the method.

In the figure, 1. laser beam, 2. constrained layer, 3. absorption layer, 4. small hole member, 5. spot, 6. laser impact route, 7. sheet boundary.

EMBODIMENTS

The present invention will be further described in detail below with reference to the drawings and specific embodiments, but the scope of the invention is not limited there to.

Embodiment 1

Figure 1:
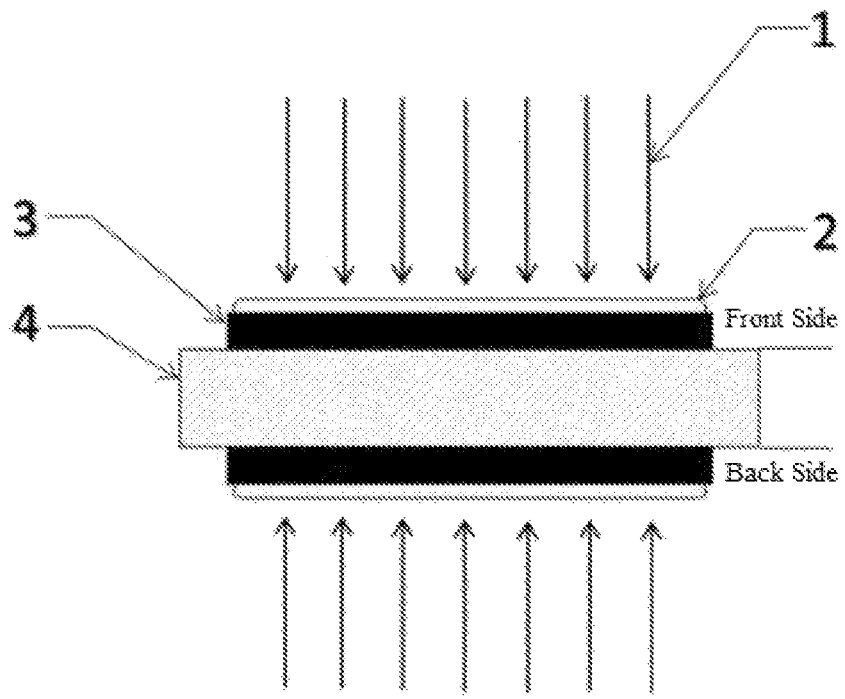
FIG. 1 is a schematic view of laser shock enhancement according to an embodiment of the present invention.
Figure 2:
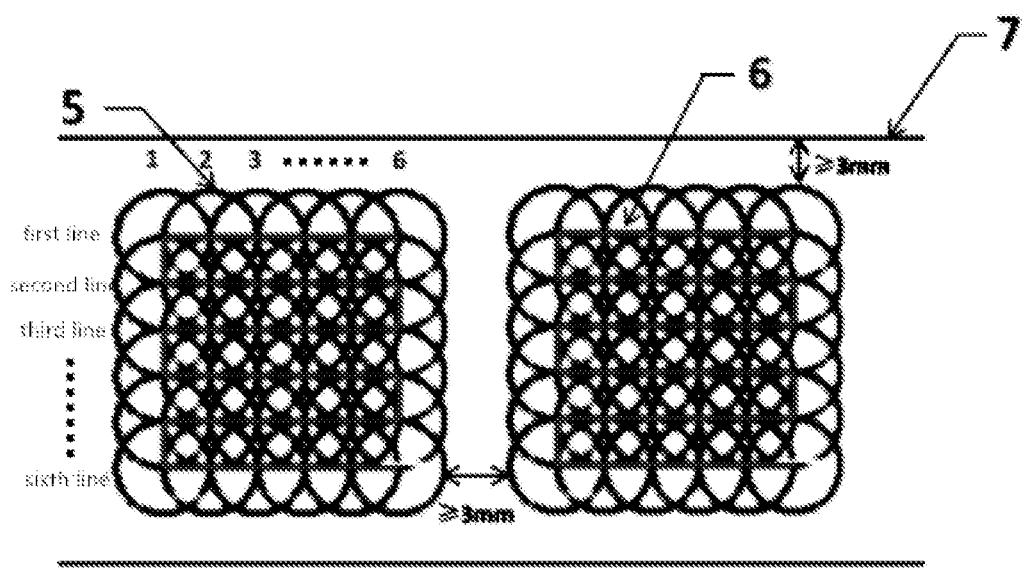
FIG. 2 is a road diagram of a laser shock process according to an embodiment of the present invention.

In this example, the material used is 7050-T7451 aluminum alloy sheet, the thickness is 3 mm, 4 mm, 5 mm, 6 mm, and the aperture size required for drilling is 2.6 mm. As shown in FIG. 1, the surface of the small hole member 4 is pretreated first, and then an aluminum foil is attached as an absorption layer 3 on the surface of the member to be drilled, and water is used as the constrained layer 2 to allow water to flow uniformly over the surface of the aluminum foil. The small hole member 4 is fixed on the CNC workbench with a clamp, and the running path of the CNC workbench is programmed so that the laser can just strengthen the part to be drilled of the member. According to the selected constrained layer 2 is water, the absorption layer 3 is aluminum foil, and $P > 2\sigma_s$, $P = k * \vec{I_0}$, it can be seen that $k=1$, $\sigma_s = 441$ Mpa, $I_0$ should be greater than the lower limit of 0.78 GW/cm².

According to empirical formula $$I_0 = Ae^{\frac{t}{B}} \frac{\sigma_s^2}{Z}$$

and B=6, then A is about 2.6; the laser power density of the small hole member 4 having a thickness of 3 mm is about 2.85 GW/cm², the laser power density of the small hole member 4 having a thickness of 4 mm is about 3.37 GW/cm², the laser power density of the small hole member 4 having a thickness of 5 mm is about 3.98 GW/cm², and the laser power density of the small hole member 4 having a thickness of 6 mm is about 4.71 GW/cm².

According to $$I_0 = \frac{4E}{\pi D^2 t_p}$$

and the laser device determines energy, pulse width, spot size and other parameters, wherein the spot diameter D ranges from 2 mm to 6 mm, the laser energy E is selected from 2 J to 35 J, and the laser pulse width $t_p$ is selected from 10 ns to 30 ns, the impact area of the laser is in the range of 2.8 d to 3.8 d and d is the aperture size, the final power density should be close to the power density obtained by taking A=2.6. The impact mode is double-sided impact, the number of layers is two, and the double-sided impact means that the front side and the back side are sequentially impacted, the double-sided impact once indicates that the number of impact layers is one layer. When the overlapping rate is 63%, the jump method is used. The jump method is to shock the third spot after the first spot, skip the second one, and so on. After the first line, shock the third line, skip the second line, and so on. After the first pass is completed, return to shock the second spot of the first line, then the fourth spot of the first line and so on, and then the second spot of the third line, and fourth spot of the third line, and so on. After the processing is completed, the second line and the fourth line are played, and the method is the same as above. When the laser device energy is small or large, the spot size can be changed to control the power density of the laser; the power density, the selected parameters and the gain at 95% confidence interval used in this example are shown in Table 1. It can be seen from the table that the average coverage n is between 400% and 700%, and the fatigue gain effect is better. In this example, the fatigue gain of the four plate thickness small hole members is relatively stable, mostly concentrated between 150% and 230%. Although the stiffness and hardness of the material are not high, the selected power density is small, so the surface quality is good, and the sheet material is basically not deformed.

TABLE 1

| Sample thickness/ mm | Power density/ GW/cm² | Spot diameter/ mm | Pulse width/ ns | Impact range | Average coverage | 95% confidence interval Fatigue gain range |
| --- | --- | --- | --- | --- | --- | --- |
| 3 | 2.83 | 2.6 | 20 | 8.6 × 8.6 | 516.59% | 190%-234% |
| 4 | 3.32 | 2.4 | 20 | 9.05 × 9.05 | 541.03% | 187%-225% |
| 5 | 3.95 | 2.2 | 20 | 8.8 × 8.8 | 480.81% | 153%-197% |
| 6 | 4.71 | 2.6 | 20 | 9.32 × 9.32 | 781.98% | 198%-230% |

Embodiment 2

The difference between this embodiment and the first embodiment is that the material used in the embodiment is a TC4-DT titanium alloy sheet having a thickness of 3 mm, 4 mm and 6 mm, and the aperture size required for the drilling is 2.6 mm. The surface of the small hole member 4 is pretreated first, and then the aluminum foil is applied as an absorption layer 3 on the surface of the position to be drilled, water is used as a constrained layer 2, and then water is allowed to flow uniformly through the surface of the aluminum foil. The fixture is used to fix the member on the CNC workbench, and the running path of the CNC workbench is programmed so that the laser can just strengthen the part to be drilled of the member. According to the selected constrained layer and the absorption layer, and $P > 2\sigma_s$, $P = k * \vec{I_0}$, it can be seen that $k=1$, $\sigma_s = 811$ Mpa, $I_0$ should be greater than the lower limit of 2.63 GW/cm².

According to empirical formula $$I_0 = Ae^{\frac{t}{B}} \frac{\sigma_s^2}{Z}$$

and B=2.6, taxing into account the stiffness and surface hardness of the titanium alloy, A is about 0.7, so the small hole member 4 with a thickness of 3 mm in this example has a laser power density of about 4.9 GW/cm², the laser power density of the small hole member 4 with a thickness of 4 mm is about 7.27 GW/cm², the laser power density of the small hole member 4 having a thickness of 6 mm is about 15.69 GW/cm². The overlapping rate used in this example is 50%, and the impact mode is double-sided impact; the power density, the selected parameters and the gain under the 95% confidence interval are shown in Table 2. In this embodiment, the fatigue gain of the three kinds of small hole members is mostly between 200% and 270%, the fatigue gain is obvious, and because the hardness and rigidity of the material are large, the surface quality after impact is good, and the sheet material is basically free from deformation.

TABLE 2

| Sample thickness/ mm | Power density/ GW/cm² | Spot diameter/ mm | Pulse width/ ns | Impact range | Average coverage | 95% confidence interval Fatigue gain range |
| --- | --- | --- | --- | --- | --- | --- |
| 3 | 4.71 | 2.6 | 20 | 9.1 × 9.1 | 461.39% | 231%-266% |
| 4 | 7.63 | 5 | 20 | 8 × 8 | 551.96% | 200%-249% |
| 6 | 15.92 | 4 | 15 | 8.2 × 8.2 | 597.74% | 200%-263% |

Embodiment 3

The difference between this embodiment and the first embodiment is that the material used in the present embodiment is a 2024-T62 aluminum alloy sheet having a thickness of 2.5 mm and 5 mm, and the aperture size required for the drilling is 2 mm. As shown in FIG. 1, the surface of the small hole member 4 was first pretreated, and then an aluminum foil was attached as an energy absorption layer 3 on the surface of the member to be drilled, and a K9 glass of 4.5 mm thick was used as the constrained layer 2. The fixture is used to fix the member on the CNC workbench with a clamp, and the running path of the CNC workbench is programmed, so that the laser can just strengthen the part to be drilled in the member. According to the selected constrained layer, the absorption layer and $P > 2\sigma_s$, $P = k \ast \vec{I_0}$, it can be seen that $k=1.62$, $\sigma_s=340$ Mpa, $I_0$ should be greater than 0.18 GW/cm².

According to empirical formula $$I_0 = Ae^{\frac{t}{B}} \frac{\sigma_s^2}{Z}$$

and B=6, A is about 4.8; the laser power density of the small hole member 4 having a thickness of 2.5 mm is about 1.57 GW/cm², and the laser power density of the small hole member 4 having a thickness of 5 mm is 2.36 GW/cm² around. According to $$I_0 = \frac{4E}{\pi D^2 t_p}$$

and laser equipment, parameters such as energy, pulse width and spot are determined, as long as the final power density is close to the power density obtained when A=4.8. The power density used, the selected parameters and their gains at 95% confidence intervals are shown in Table 3. The fatigue gain of real samples in this group is obvious. However, due to the low hardness of the material and the value of A is large, the surface of the material has deep pits, and the surface quality is relatively poor.

The strengthening effect that can be achieved by the method is described in conjunction with Tables 1, 2 and 3. The fatigue power gain obtained by using the laser power density selected by the method and the selected laser parameters is obvious and stable, the material deformation amount is close to zero, and the surface does not appear ablated.

The described embodiments describe the essential features and advantages of the present invention. It should be understood by those skilled in the relevant art that the above embodiments do not limit the present invention. The description and examples merely illustrate the core principles of the present invention. On the basis of this, the present invention can continue to be optimized and improved, and these optimizations and improvements are within the scope of the present invention.

The invention claimed is:

1. A laser shock processing method for small hole members with different thicknesses, comprising the steps of: pretreating a surface of the small hole member, and then providing an absorption layer on the surface of the small hole member to be drilled, a constrained layer is arranged on the surface of the absorption layer, the pre-treated small hole member is fixed on a CNC workbench, and the laser is used to shock strengthen an area to be drilled of the small hole member, different laser process parameters are adopted for small hole members with different thicknesses, the selection and determination of process parameters are as follows:

1) Select a power density according to a yield strength and material thickness of the small hole member, a relationship between the power density and the material thickness of the small hole member is determined by the formula $$I_0 = Ae^{\frac{t}{B}} \frac{\sigma_s^2}{Z}.$$

wherein $I_0$ is laser power density, $\sigma_s$ is the yield strength of the material, t is the material thickness of the small hole member;

$$\frac{2}{Z} = \frac{1}{Z_1} + \frac{1}{Z_2},$$

TABLE 3

| Sample thickness/ mm | Power density/ GW/cm² | Spot diameter/ mm | Pulse width/ ns | Impact range/ mm² | Average coverage | 95% confidence interval Fatigue gain range |
| --- | --- | --- | --- | --- | --- | --- |
| 2.5 | 1.57 | 3 | 18 | 7.5 × 7.5 | 401.92% | 171%-270% |
| 5 | 2.36 | 3 | 18 | 7.5 × 7.5 | 401.92% | 213%-289% |

Z is the synthetic acoustic impedance, $Z_1$ is the acoustic impedance of the material of the small hole member, $Z_2$ is the acoustic impedance of the constrained layer; A is a comprehensive coefficient and is related to the material of the small hole member, the constrained layer and the absorption layer; B is a material thickness influence coefficient related to the material and material thickness of the small hole member;

2) The value of $I_0$ determined above, the lower limit is satisfied by $P=k*\sqrt{I_0}$ with $P>2\sigma_s P^{\sigma_s}$, wherein P is the peak pressure of the laser shock load acting on the material of the small hole member, $\sigma_s$ is the yield strength of the material, k is a constant related to the constrained layer and the absorption layer;

3) The spot diameter D and the pulse laser energy E are determined according to the formula $$I_0 = \frac{4E}{\pi D^2 t_p},$$

$t_p$ is the laser pulse width; the spot diameter D ranges from 2 mm to 6 mm, the pulse laser energy E ranges from 2 J to 35 J, and the laser pulse width $t_p$ ranges from 10 ns to 30 ns;

4) After determining the laser energy E, the laser pulse width $t_p$ and the spot diameter D, the overlapping rate ψ and the number of impact layers n are selected; the number of impact layers n ranges from 1 to 6; the overlapping rate ψ=(Spot diameter D−Center distance between adjacent spots s)/Spot diameter D.

2. The laser shock processing method for small hole members with different thicknesses according to claim 1, wherein the overlapping rate iv and the number of impact layers n are related to an average coverage rate n;

the average coverage rate η=N*$s_1$/S, N is the total number of spots on one side of the small hole member, $s_1$ is the area of one spot, S is the area of the impact area of the hole position; the average coverage rate η is 200% to 800%, if the average coverage rate η is not in the range of 200% to 800%, the overlapping rate iv and the number of impact layers η need to be re-selected.

3. The laser shock processing method for small hole members with different thicknesses according to claim 1, wherein the formula $$I_0 = Ae^{\frac{t}{B}} \frac{\sigma_s^2}{Z},$$

when the small hole member is an aluminum alloy, the material thickness influence coefficient B=6;

when the constrained layer is any one of water, k9 optical glass, polymethyl methacrylate, silica gel or synthetic resin, and the absorption layer is aluminum foil, the comprehensive coefficient A ranges from 2 to 5.

4. The laser shock processing method for small hole members with different thicknesses according to claim 1, wherein the formula $$I_0 = Ae^{\frac{t}{B}} \frac{\sigma_s^2}{Z},$$

when the small hole member is a titanium alloy, the material thickness influence coefficient B=2.6;

when the constrained layer is any one of water, k9 optical glass, polymethyl methacrylate, silica gel or synthetic resin, and the absorption layer is an aluminum foil, the comprehensive coefficient A ranges from 0.5 to 1.25.

5. The laser shock processing method for small hole members with different thicknesses according to claim 1, wherein the laser impact region ranges from 2.8 d to 3.8 d, and d is a diameter of a hole to be drilled after laser shock processing.

6. The laser shock processing method for small hole members with different thicknesses according to claim 5, wherein the distance between the laser impact region and an edge of the small hole member or adjacent laser impact region is not less than 3 mm.

7. The laser shock processing method for small hole members with different thicknesses according to claim 1, wherein the laser impact mode is double-sided impact.

* * * * *